United States Patent
Balakrishnan et al.

[19]

[11] Patent Number: 6,028,612
[45] Date of Patent: Feb. 22, 2000

[54] PICTURE MEMORY MAPPING TO MINIMIZE MEMORY BANDWIDTH IN COMPRESSION AND DECOMPRESSION OF DATA SEQUENCES

[75] Inventors: Jeyendran Balakrishnan, San Jose; Jefferson E. Owen, Fremont, both of Calif.

[73] Assignee: STMicroelectronics, Inc., Carrollton, Tex.

[21] Appl. No.: 08/972,917

[22] Filed: Nov. 18, 1997

[51] Int. Cl.$^7$ ...................................................... G06F 12/06
[52] U.S. Cl. ............................ 345/517; 345/507; 348/716
[58] Field of Search .................................... 345/520, 521, 345/526, 507, 516, 517, 203, 501; 348/412, 415, 416, 714, 715, 716, 718, 719

[56] References Cited

U.S. PATENT DOCUMENTS

| | | | |
|---|---|---|---|
| 5,510,857 | 4/1996 | Kopel et al. ............................... | 348/699 |
| 5,579,052 | 11/1996 | Artieri ....................................... | 48/416 |
| 5,581,310 | 12/1996 | Vinekar et al. ........................... | 348/718 |
| 5,675,387 | 10/1997 | Hoogenboom et al. ................. | 348/416 |
| 5,754,234 | 5/1998 | Kitsuki et al. ............................ | 348/394 |
| 5,790,712 | 8/1998 | Fandrianto et al. ..................... | 382/276 |
| 5,850,483 | 12/1998 | Takabatake et al. .................... | 382/233 |
| 5,859,651 | 1/1999 | Potu ......................................... | 345/526 |
| 5,874,995 | 2/1999 | Naimpally et al. ...................... | 348/384 |
| 5,880,786 | 3/1999 | Okku et al. ............................... | 348/415 |
| 5,920,352 | 7/1999 | Inoue ....................................... | 348/384 |
| 5,936,670 | 8/1999 | Frencken ................................. | 348/413 |

*Primary Examiner*—Ulka J. Chauhan
*Attorney, Agent, or Firm*—David V. Carlson; Theodore E. Galanthay; Lisa K. Jorgenson

[57] ABSTRACT

A method of a storing a picture in a memory such that bandwidth can be reduced when retrieving an array portion of the picture from the memory, and a memory architecture are disclosed. The memory is subdivided into a plurality of words for storing a picture having rows and columns. The picture is partitioned into two or more stripes each having a predetermined number of columns. The number of bytes in one row of one stripe is equal to the number of bytes in one word, for storing the data in one row of a stripe in one word. For the case of progressive video sequences or images the memory is organized in frame structure. For the case of interlaced video sequences or images, the memory is organized in field structure. For a frame picture to be stored in a frame organized memory or a field picture to be stored in a field organized memory, the data in the first row of one of the stripes is stored in a first word. The data in each subsequent row of the stripe is stored in a word having a word address adjacent and subsequent to the word storing the data of the directly preceding row. For a frame picture to be stored in a field organized memory, the odd rows are stored together according the above mapping scheme in a first memory buffer, and the even rows are stored together according to the above mapping scheme in a second memory buffer.

54 Claims, 7 Drawing Sheets

PICTURE MEMORY MAPPING TO MINIMIZE MEMORY BANDWIDTH IN COMPRESSION AND DECOMPRESSION OF DATA SEQUENCES

CROSS-REFERENCE TO RELATED APPLICATIONS

This application contains some text and drawings in common with pending U.S. Patent Applications entitled: "Tiling In Picture Memory Mapping to Minimize Memory Bandwidth In Compression And Decompression Of Data Sequences" by Peter McGuinness, Ser. No. 08/972,641, and has the same effective filing date and ownership as the present application, and to that extent is related to the present application, which is incorporated herein by reference.

BACKGROUND

The present invention relates to the field of electronic devices having a memory array, and is more specifically directed to methods and circuits for storing and retrieving a large amount of data that needs to be accessed sequentially.

The size of a digital representation of uncompressed video images depends on the resolution and color depth of the image. A movie composed of a sequence of uncompressed video images, and accompanying audio signals, quickly becomes too large to fit entirely onto conventional recording medium, such as a compact disk (CD). Moreover, transmitting such an uncompressed movie over a communication link is prohibitively expensive because of the large quantity of data to be transmitted and the bandwidth required to do so.

It is therefore advantageous to compress video and audio sequences before they are transmitted or stored. A great deal of effort is being expended to develop systems to compress these sequences. There are several coding standards currently used that are based on the DCT algorithm, including MPEG-1, MPEG-2, H.261, and H.263. (MPEG is an acronym for "Motion Picture Expert Group", a committee of the International Organization for Standardization, ISO.) The MPEG-1, MPEG-2, H.261 and H.263 standards include decompression protocols that describe how an encoded (i.e. compressed) bitstream is to be decoded (i.e. decompressed). The encoding can be done in any manner, as long as the resulting bitstream complies with the standard.

Video and/or audio compression devices (hereinafter encoders) are used to encode the video and/or audio sequence before the sequence is transmitted or stored. The resulting encoded bitstream is decoded by a video and/or audio decompression device (hereinafter decoder) before the video and/or audio sequence is output. A bitstream can only be decoded by a decoder if the bitstream complies with the standard used by the decoder. To be able to decode the bitstream on a large number of systems, it is advantageous to encode the video and/or audio sequences according to a well accepted encoding/decoding standard. The MPEG standards are currently well accepted standards for one way communication. H.261, and H.263 are currently well accepted standards for two way communication, such as video telephony.

Once decoded, the decoded video and audio sequences can be played on an electronic system dedicated to video and audio playback, such as a television or a digital versatile disc (DVD) player, or on an electronic system where image display and audio is just one feature of the system, such as a computer. A decoder needs to be added to these electronic systems to allow them to decode the compressed bitstream into uncompressed data, before it can be played back. An encoder needs to be added to allow such electronic systems to compress video and/or audio sequences that are to be transmitted or stored. Both the encoder and decoder need to be added for two way communication.

Figure 1:
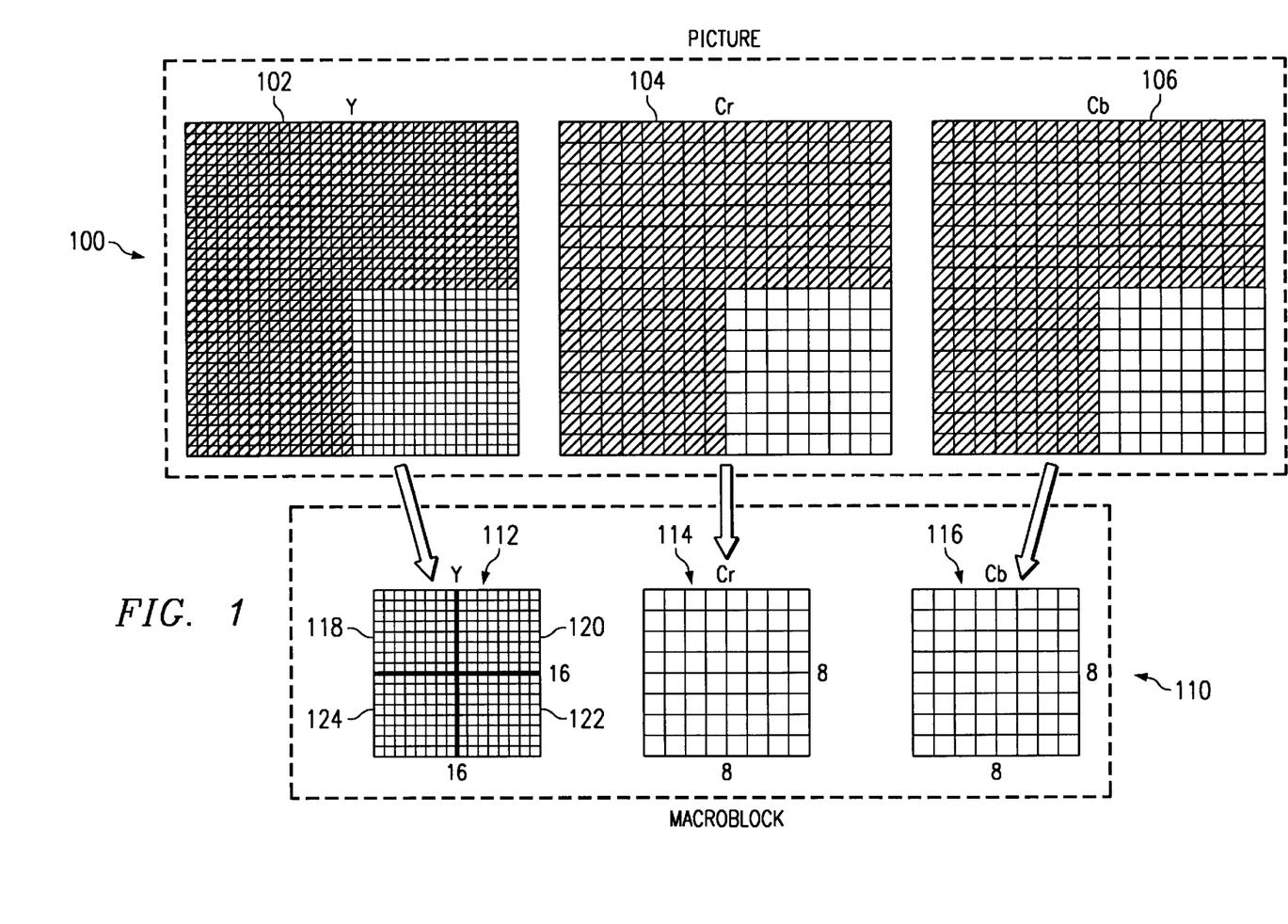
FIG. 1 is a block diagram of an MPEG picture and macroblock in a 4:2:0 format.

The encoded bitstream for video contains compressed pictures. A picture is a data structure representing the encoded data for one displayable image in the video sequence. As shown in FIG. 1, a picture 100 is collection of three two-dimensional arrays of pixels, one array for luminance samples 102 and two arrays for chrominance samples 104, 106, i.e., color difference samples. The picture is typically further subdivided into smaller subunits, such as macroblocks 110. A macroblock is a data structure having a 16×16 array of luminance samples 112 and two 8×8 arrays of associated chrominance samples 114, 116. The macroblock 110 in an encoded picture contains a header portion having motion compensation information and 6 block data structures of encoded data. A block is the basic unit for DCT based transform coding and is a data structure encoding an 8×8 sub array of pixels. A macroblock represents four luminance blocks 118, 120, 122, 124 and two chrominance blocks 114, 116.

The chrominance samples are typically sampled at half the sampling rate of the luminance samples in both vertical and horizontal directions, producing a sampling mode of 4:2:0 (luminance:chrominance:chrominance). The color difference can also be sampled at other frequencies, for example one-half the sampling rate of the luminance in the vertical direction and the same sampling rate as the luminance in the horizontal direction, producing a sampling mode of 4:2:2.

Both MPEG-1 and MPEG-2 support multiple types of coded pictures: Intra (I) pictures, Forward Predicted (P) pictures, and Bidirectionally Predicted (B) pictures. I pictures contain only intrapicture coding. P and B pictures may contain both intrapicture and interpicture coding. I and P pictures are used as reference pictures for interpicture coding.

Intrapicture coding for I pictures involves the reduction of redundancy between the original pixels in the macroblocks using block based DCT techniques, although other coding techniques can be used. For P and B pictures, intrapicture coding involves using the same DCT based techniques to remove redundancy between interpicture prediction error pixels.

Figure 2:
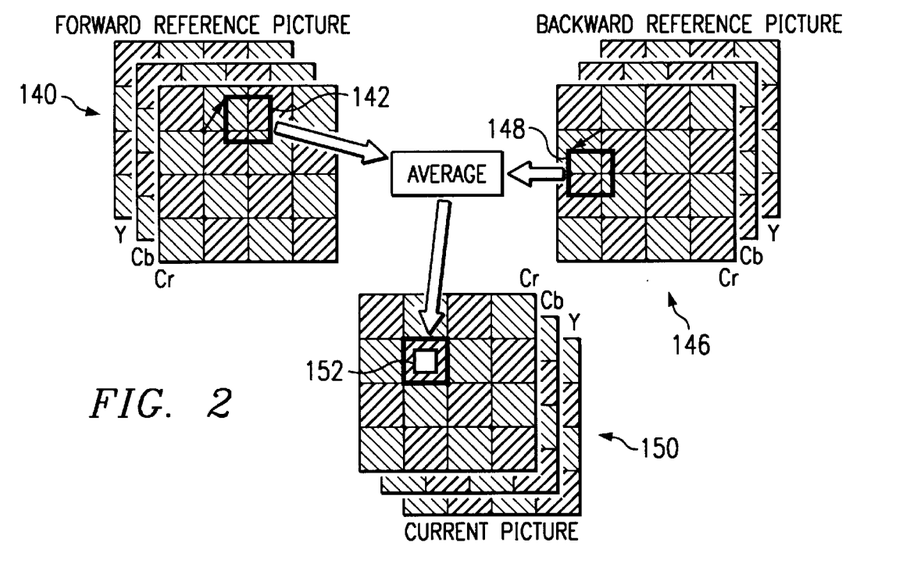
FIG. 2 is a block diagram of MPEG motion compensated prediction.

In interpicture coding, the redundancy between two pictures is eliminated as much as possible and the residual differences, i.e., interpicture prediction errors, between the two pictures are transmitted. In scenes where objects are stationary, the pixel values in adjacent pictures will be approximately equal. In scenes with moving objects, block based motion compensated prediction, based on macroblocks, is used. For each macroblock in a P picture, the best matching 16×16 block in the previous picture, (called the prediction block) is found, and the resultant macroblock prediction error is then encoded. The match is determined by searching in the previous picture over a neighborhood of the pixel origin of the current macroblock. The motion vectors between the current macroblock and the prediction block are also transmitted in interpicture coding that uses motion compensation. The motion vectors describe how far, and in what direction, the macroblock has moved compared to the prediction block. As shown in FIG. 2, for B pictures the best matching block 142, the prediction block, in the previous picture 140 and the best matching block 148, the prediction block in the future picture 146 is found, and averaged. This may then be summed with a set of decoded error terms of the block data structures of macroblock 152 to produce the macroblock 152 in the current picture 150. This entire process is referred to as motion compensation.

SUMMARY OF THE INVENTION

A memory in accordance with the present invention includes a plurality of memory words for storing a two-dimensional digital array of data bytes having rows and columns. The digital array is partitioned into two or more stripes, each stripe having a predetermined number of columns. The number of bytes in one row of one stripe is equal to the number of bytes in one word, so that the data in one row of a stripe is stored in one word of the memory. The data in the first row of one of the stripes is in a first word. The data in each subsequent row of that stripe is in a word having a word address adjacent and subsequent to the word storing the data of the directly preceding row. This allows easy retrieval of the subsequent row upon the retrieval of the preceding row.

In operation, the digital array of data bytes is partitioned into two or more stripes, each stripe having a predetermined number of columns. The data in the first row of one of the stripes is stored in a first word and the data in each subsequent row of the stripe is stored in a word having a word address adjacent and subsequent to the word storing the data of the directly preceding row.

An arbitrary array portion of the digital array is retrieved from the memory. The word address of the word storing the column and the row corresponding to the first datum of the array portion is determined. The number of stripes that contain data in the array portion is also determined. The desired array portion is then read from memory by reading in each stripe. Within each stripe, the data is read in one memory burst, beginning from the starting row.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

BRIEF DESCRIPTION OF THE DRAWINGS

Parts common to FIGS. 1 through 8 are indicated using the same numbering system.

DETAILED DESCRIPTION OF THE PREFERRED EMBODIMENT

Interpicture coding requires a decoder to have access to the previous and/or future pictures, i.e., the I and/or P pictures, that contain information needed to decode or encode the current image. These previous and/or future images need to be stored and then used to decode the current image, which also needs to be stored as it is being decoded. These pictures are typically stored in memory buffers. The luminance Y and the two types of chrominance Cb and Cr components of each picture are stored independently, each typically stored in a memory buffer. Therefore, each picture requires three buffers. One byte of storage is required for each pixel in each of these three picture blocks. A decoder capable of interpicture coding using both forward and backward prediction, i.e., both I, P, and B pictures, requires buffers for the previous and future reference pictures and for the picture being decompressed, for a total of nine buffers. If a field memory storage technique is chosen, to accommodate interlaced video or image sequences twice as many buffers (eighteen) will be needed as for a non-interlaced sequence, because in interlaced video or image sequences only half the pixels are present in successive pictures. These buffers can be half as big as the buffers for non-interlaced video. All of the above buffers can be in one memory device.

The memory requirements of a typical MPEG-2 decoder for a Phase Alternation Line (PAL) and National Television Standards Committee (NTSC) application, capable of supporting main profile at main level, are typically broken down to the audio and MPEG-2 video requirements. When the audio is MPEG-1, the audio decoder requires 131,072 bits of memory. The MPEG-2 video memory can be logically configured into buffers as follows:

A "Bit buffer," which is a buffer for compressed data that the MPEG-2 standard fixes at 1.75 Mbits plus an extra amount, for example 835,584 bits, for a non-ideal decompression process;

A forward or previous reference frame buffer for a decompressed I or P frame in a 4:2:0 format;

A backward or future reference frame buffer for a decompressed I or P frame in a 4:2:0 format;

A B frame buffer for a decompressed B-frame in a 4:2:0 format. The B frame buffer can be optimized to require a reduced amount of memory, that is 0.7407 or 0.6111 of an I frame respectively for PAL or NTSC system.

According to the present MPEG-2 standard technique, and regardless of which frame, i.e. I, P, or B, is concerned, each frame buffer may occupy an amount of memory given by the following table:

| | |
|---|---|
| standard PAL | 720 × 576 × 8 bits for the luma |
| | 360 × 288 × 8 bits for the Cb chroma |
| | 360 × 288 × 8 bits for the Cr chroma = 4,976,640 bits |
| standard NTSC | 720 × 480 × 8 bits for the luma |
| | 360 × 240 × 8 bits for the Cb chroma |
| | 360 × 240 × 8 bits for the Cr chroma = 4,147,200 bits |

Taking a PAL system, which represents the most burdensome case, as a reference example, the total amount of memory required is given by:

1,835,008+835,584+4,976,640+4,976,640+(4,976,640*0.7407)=16,310,070 bits.

This calculation takes into account a 0.7407 optimization of the B-picture frame buffer.

Therefore, a typical MPEG-2 decoder requires 16 Mbits of memory to operate in the main profile at main level mode (MP at ML). This means that the decoder requires a 2 Mbyte memory.

Figure 3:
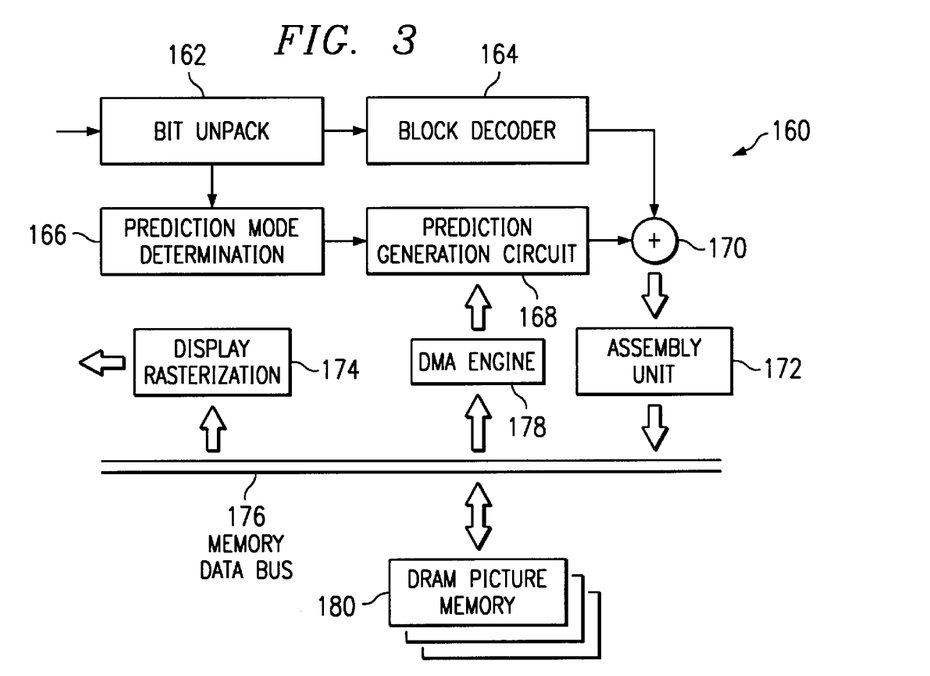
FIG. 3 is a block diagram of a video decoder that can be used with the present invention.

Referring to FIG. 3, a decoder 160 that can be used with the present invention is shown. The decoder 160 can be any decoder that needs to access data of a considerable size in order to decompress the bitstream, such as a video or image decoder. FIG. 3 specifically shows a decoder 160 that uses motion compensated prediction in decompressing frames, nevertheless, those skilled in the art will appreciate that a decoder that uses different decoding techniques can be used to practice the present invention. Although the invention is most useful for video or image (e.g., JPEG, M-JPEG, H.261, H.263, MPEG-1 and MPEG-2) decoders because of the large size of the images, the decoder 160 can be a video and audio, or a stand alone video or audio decoder.

The encoded bitstream is received by a bit unpack circuit. The bit unpack circuit typically contains a first-in-first-out (FIFO) buffer, although the buffer can be any type of memory, and a macroblock (MBLK) parser. The FIFO buffers the incoming encoded bitstream as previously received data is being decoded. The output of the FIFO is coupled to the MBLK parser. The MBLK parser parses the information into macroblocks, and then parses each macroblock and sends the header portion of each macroblock to a prediction mode determination circuit 166. The prediction mode determination circuit 166 determines the type of prediction to be performed to determine which frames a prediction generation circuit 168 will need to access. The prediction mode determination circuit 166 also determines the word address in memory 180 where the frame, and the prediction block within the frame, that is needed to form the motion compensation prediction is located. These addresses are computed using the prediction modes and motion vectors. Typically, there is a DMA engine 178 in the decoder that controls all of the interfaces with the memory 180. Since the required prediction block may be located at half-pixel boundaries, as is possible in the MPEG and H.263 standards, it may be needed to compute such a block by averaging the two prediction blocks located at either side of the half pixel location. This function is performed by the prefetch and ½-pixel filter circuits. The prediction generator circuit forms the final motion-compensated prediction block by averaging the ½ pixel filtered prediction blocks that have been generated from forward and backward reference pictures. This decodes motion compensation prediction.

The MBLK parser also sends the encoded block data structures of each macroblock to a block decoder 164. In the case of non-intracoded macroblocks, the block decoder 164 decodes the interpicture prediction errors in the block. The motion compensation prediction and the prediction errors are summed in the summing circuit 170 and passed to the assembly unit 172. In the case of intracoded macroblocks, the block decoder directly decodes the pixels in the macroblock. The summing circuit in such case merely passes through these pixels to the assembly unit.

Because in interpicture compression some frames require access to future frames to be decoded, the required frames should be sent before the frame that requires them. In the MPEG standards, frames can require both past and future frames for decompression, therefore the compressed frames are not sent in the same order that they are displayed in the video sequence. The assembly unit 172 ensures that the information is placed in the correct place in memory to correspond to the frame being decompressed. The resulting decoded macroblock now needs to be stored in the memory 180 in the place designated for in by the assembly unit 172.

When each macroblock is being decoded, it and its reference macroblocks need to be obtained from the memory. The decoder should be able to access the memory quickly enough to be able to operate in real time. This means that the decoder should be fast enough to be able to access and process the entire picture in the time between screen refreshes, which is typically 1/30 of a second, with the human viewer not being able to detect any delay in the decoding. A goal is to have the decoder operate in real time without dropping so many pictures that it becomes noticeable to the human viewer of the movie. Ideally, the decoder would operate fast enough so that no pictures are dropped. If the decoder does not operate in real time, the decoded movie would stop and wait periodically between images until the decoder can get access to the memory to process the next image.

The computer can also contain both a decoder and encoder to allow for video telephony, as described above. In this case, not operating in real time would mean that the length of time between the occurrence of an event, such as speaking, at one end of the conversation, and the display of the event at the other end of the conversation, is increased by the time both the encoder and then the decoder must wait to get access to the bus and the main memory. Not being able to operate in real time means that there would be gaps in the conversation until the equipment can catch up. This increases the time needed to have a video conference, and more importantly, makes the conference uncomfortable for the participants.

The decoder can share a memory with the computer as described in pending U.S. Patent Applications entitled: "Video and/or Audio Decompression and/or Compression Device that Shares a Memory" by Jefferson E. Owen, Raul Z. Diaz, and Osvaldo Colavin, Ser. No. 08/702,910, incorporated herein by this reference.

When the decoder is sharing memory with the computer, there are typically many components in the computer systems that may require access to the main memory as well. These devices are typically all coupled to the same bus as the decoder, or possibly to several buses if there are not enough connectors on one bus to accommodate all of the peripherals. However, the addition of each bus is very expensive. Each request to access the memory is typically processed according to a priority system. The priority system is typically based on the priority given to the device and the order in which the requests are received. Typically, the priority system is set up so no device monopolizes the bus, starving all of the other devices. Good practice suggest that no device on the bus require more than approximately 50% of the bandwidth of the bus.

The minimum bandwidth required for the decoder can be calculated based on the characteristics and desired operation of the decoder. These characteristics include the standard to which the bitstream is encoded to comply with, whether the decoder is to operate in real time, to what extent pictures are dropped, and how the images are stored. Additionally, the latency of the bus that couples the decoder to the memory should be considered.

If the memory bandwidth required by the particular decoder implementation exceeds the available memory bandwidth of the memory system in that implementation, the decoder will not be able to decode pictures in real time. In such case, to avoid having to decode and display pictures slower than real time, the decoder will regularly have to drop pictures. This allows the decoder to reduce the effective memory bandwidth required, enabling it to "catch up" periodically. However, regular picture dropping produces poor continuity in the displayed video, introducing artifacts like jerky appearance of sequences containing smooth motion. A more severe problem occurs in video or image sequences encoded to the H.26X or MPEG-X standards, or any other standard that uses temporal compression. In temporal (interpicture) compression, some of the images are decoded based on previous images and some based on previous and future images. Dropping an image on which the decoding of other images is based is unacceptable, because the decoding of all future dependent pictures will be in error. This results in extended periods of poor or even completely unrecognizable images.

One widely used solution to allow a component in a computer system to operate in real time without regularly dropping too many pictures, is to give the component its own dedicated memory. Thus, the decoder can be given its own dedicated memory, with a dedicated bus to connect the decoder to its dedicated memory. The decoder will also require additional pins to interface to the memory increasing the size of the decoder. The dedicated memory and the pins needed to interface with it significantly increase the cost of adding a decoder to the computer. A disadvantage of a computer equipped with such a decoder is that it has a nonnegligible amount of memory that is unused most of the time.

Indeed, the dedicated memory is only used when decoded images are being viewed on the computer screen or need to be encoded, which only amounts to a fraction of the time for typical computer usage. This memory, inaccessible to the other peripherals or to the CPU, typically requires a size of 512 Kbytes in an MPG-1 decoder, and a size of 2 Mbytes in an MPEG-2 decoder. Further, this memory is oversized, since it is obtained by using currently available memory components.

Additionally, as is becoming common, if the decoded pictures must be further processed by other software methods (e.g., composited with graphics data, morphed, or filtered), before being displayed, the decompressed data must be transmitted to the main memory of the computer and then to the display device. This again adds to the memory bandwidth load of the main memory, offsetting the advantages of using a separate decoder memory.

Therefore, it is advantageous for the decoder to share memory with the computer, for example to share the computer's main memory, without taking up so much bandwidth that it starves other devices connected to the memory, but still allowing the decoder to operate in real time. In this situation, the choice of how pixels in the decoded pictures are mapped to memory addresses in the main memory directly determines the memory bandwidth required by the decoding process, and hence the extent to which the decoder can operate in real time.

The block based motion compensation algorithm specified by the MPEG-X or H.26x video standards requires the retrieving of prediction blocks and the storage of decoded macroblocks in the image (pixel) coordinate space. Hence in this coordinate space, the peak number of pixels transferred per second is fixed a priori by the algorithm itself. The encoded bit mode and encoding methods determine the average bandwidth. However, different pixel locations in the picture coordinate space are mapped into different byte locations in the memory, and the access to a portion of a picture must be decomposed into a number of atomic transfers, each involving the transfer of a certain number of bytes or words. Since an overhead delay is incurred with each atomic transfer, it follows that the total number of clock cycles required to retrieve a block of pixels increases with the number and size of each of these atomic transfers. Consequently, the actual memory bandwidth is in large part dictated by the picture memory mapping that directly determines how a macroblock or prediction block of pixels is written into and retrieved from the storage memory.

The most efficient transfer mode is a burst mode transfer, where a command to access a block of N words takes N+M cycles, where M is the burst mode overhead that is independent of N. This is in contrast to nonburst mode transfers, where an N word access requires kN+M cycles, where typically k>1. Therefore, a burst mode memory is preferred. Additionally because of the large size of the picture, typically a DRAM is preferred, such as burst EDO or SDRAM, although other memories can be used. Burst mode DRAMs are logically organized as a linear array of words, with each word being an integral number of bytes (e.g., 32 or 64 bits). Data can be accessed at clock edges in units of 1, 2, 4, or 8 bytes. An overhead of a certain number of block cycles is associated with each form of burst data transfer. Typically, this overhead is a combination of access delay and the time required for DRAM refresh precharge. Since the delay per burst is fixed, minimizing the number of bursts per macroblock or prediction block of pixels directly minimizes the number of clock cycles required to transfer each such macroblock or prediction block, which in turn minimizes the memory bandwidth consumed by the overall decoding process.

The memory structure of the present invention is to store frame pictures in progressive video or image sequences, or still images (e.g., JPEG, M-JPEG, H.261, H.263, MPEG1 and progressive MPEG-2 video sequences) in frame buffers. This is referred to as frame organized memory. In the case of interlaced sequences (e.g., interlaced MPEG-2 sequences), a field organized memory is used. Here, each field picture is stored in a field picture buffer, whereas a frame picture is logically partitioned into top and bottom fields and stored in separate field picture buffers. A field organized memory minimizes the memory bandwidth required for processing interlaced sequences (compared to frame organized memory) because such processing requires the reading and writing of rectangular pixel blocks from individual fields. A further advantage of field organized memory is that the field buffers can be directly transmitted to the display device (further reducing memory bandwidth), in the case of interlaced displays like television monitors.

Figure 4:
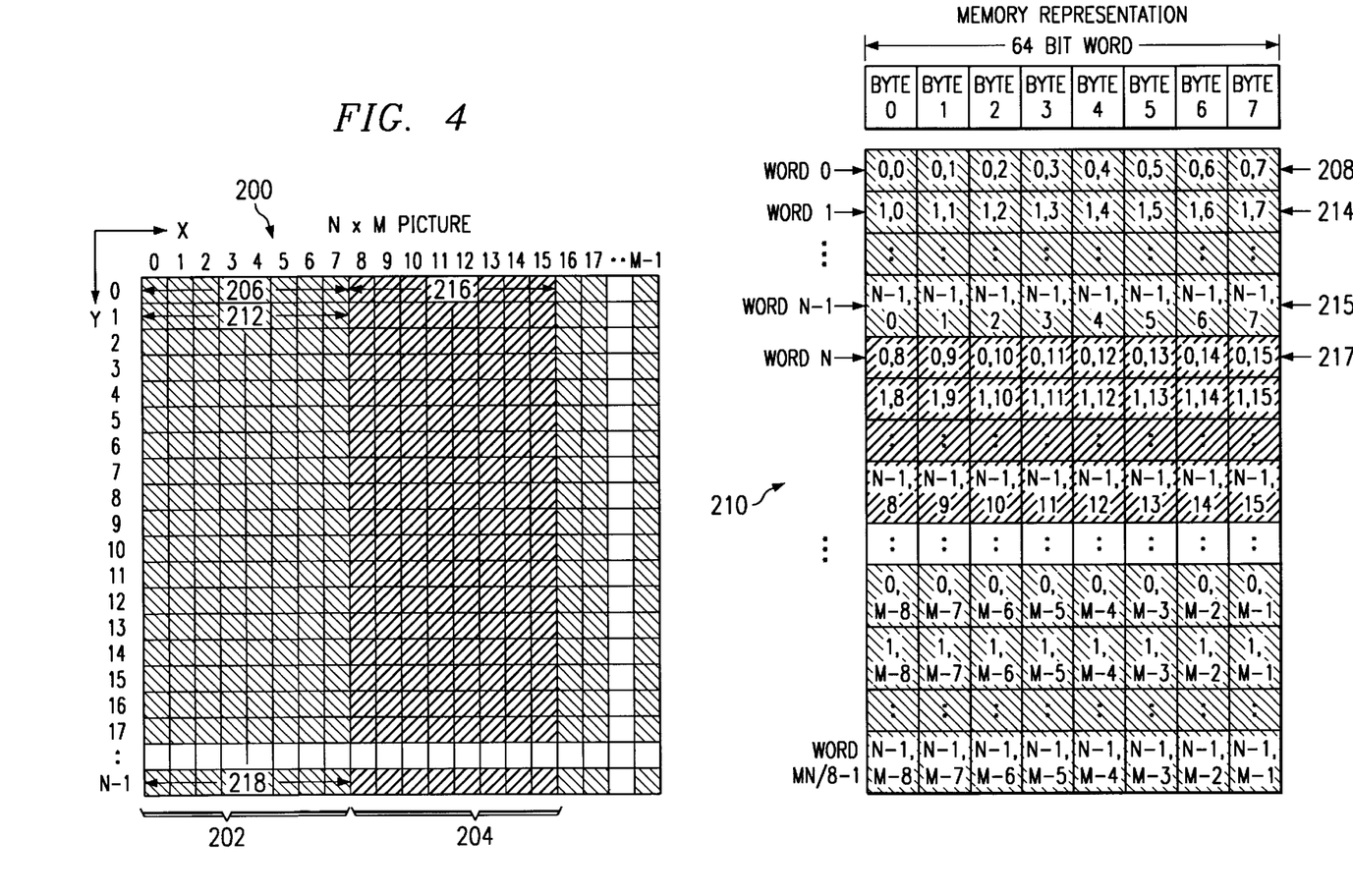
FIG. 4 is a block diagram showing the storage format of a frame picture in a frame organized memory and a field picture in a field organized memory.

The mapping of the frame picture into a memory buffer in a frame organized memory or of a field picture in a field organized memory will now be described. FIG. 4 shows a digital array, such as a picture, designated generally by reference number 200 and a memory buffer designated generally by the reference number 210. The picture 200 represents one of the components, either luminance or chrominance, of one of the pictures used for prediction, either I, P, or B picture. The memory buffer 210 is part of the memory of the device that contains the decoder. The memory is preferably shared with other components of the device the decoder is in (e.g., the main memory of a computer), although it can be a dedicated memory. The method of mapping the frame picture into a memory buffer in a frame organized memory or of a field picture into a field organized memory is the same for all of the pictures used for prediction, I, P, or B, and for all color components of the picture (e.g., luminance or chrominance component in YUV coordinates, or red, green or blue component in RGB coordinates). Therefore, for ease of reference the method of mapping the picture 200 into the memory buffer 210 will be described with reference to one representative picture 200.

The picture 200 has N rows and M columns. The memory buffer also has rows and columns and is subdivided into words. Preferably, each word is 64 bits, however words of any length can be used.

The picture is vertically partitioned into stripes. Each of the stripes has 8 columns. This puts 8 pixels into each row in the stripe. 8 pixels will fit into one 64-bit memory word. More generally, the stripes can have any predetermined number of columns as long as the number of bytes needed to fit the number of pixels in one row of a stripe is equal to the number of bytes in one memory word. This allows the storing of the data in one row of a stripe into one word. A location in memory is selected as the first word 208, and the data in the first row 206 of the first stripe 202 of the picture, is stored in the first word 208. The data in a subsequent row 212 is stored in the next word 214. This is continued for the entire stripe 202. Storing a row of the stripe 202 in a word directly after the word that stores the preceding row of the stripe 202 allows easy retrieval of the rows in a single burst, reducing the bandwidth required for the decoding process.

In one embodiment of the invention the first row 216 of the subsequent stripe 204 is stored a word 217 having a word address adjacent and subsequent to the word 215 storing the data of the last row 218 of the directly preceding stripe 202. This allows easy retrieval of the rows of subsequent stripe 204 upon the retrieval of the last row or rows of the directly preceding stripe 202. The above process is repeated for each stripe.

In general, the byte address A in memory of a typical pixel located at row R and column C in the N×M picture is given by the following algorithm: Let WO be the word address of the first word 208 in the memory buffer (corresponding to the first row 206 of the first stripe 202 of the picture). The stripe number S to which the pixel belongs is computed as $$S = C \ div \ 8,$$

i.e., the integer quotient obtained by dividing C by 8 and neglecting the remainder.
Then the word address W of the given pixel in memory is given by $$W = WO + N*S + R$$

Within the word, the byte offset of the pixel from the least significant byte address is given by $$BO = C \ mod \ 8$$

i.e., the integer remainder after C is divided by 8.

The full byte address A in memory is finally computed as $$A = W*8 + BO.$$

The above algorithm applies to the general case of K bytes per memory word if the number 8 in the previous four equations is replaced by K.

When the typical prediction block to be accessed from the picture has more or equal number of pixels vertically than horizontally, it is advantageous for stripes to be vertical, i.e. the rows are horizontal and the columns are vertical, as described this far. When the prediction block has more pixels horizontally than vertically the reverse is true. It is more advantageous for the stripes to be horizontal, making the rows vertical and the columns horizontal.

Figure 5A:
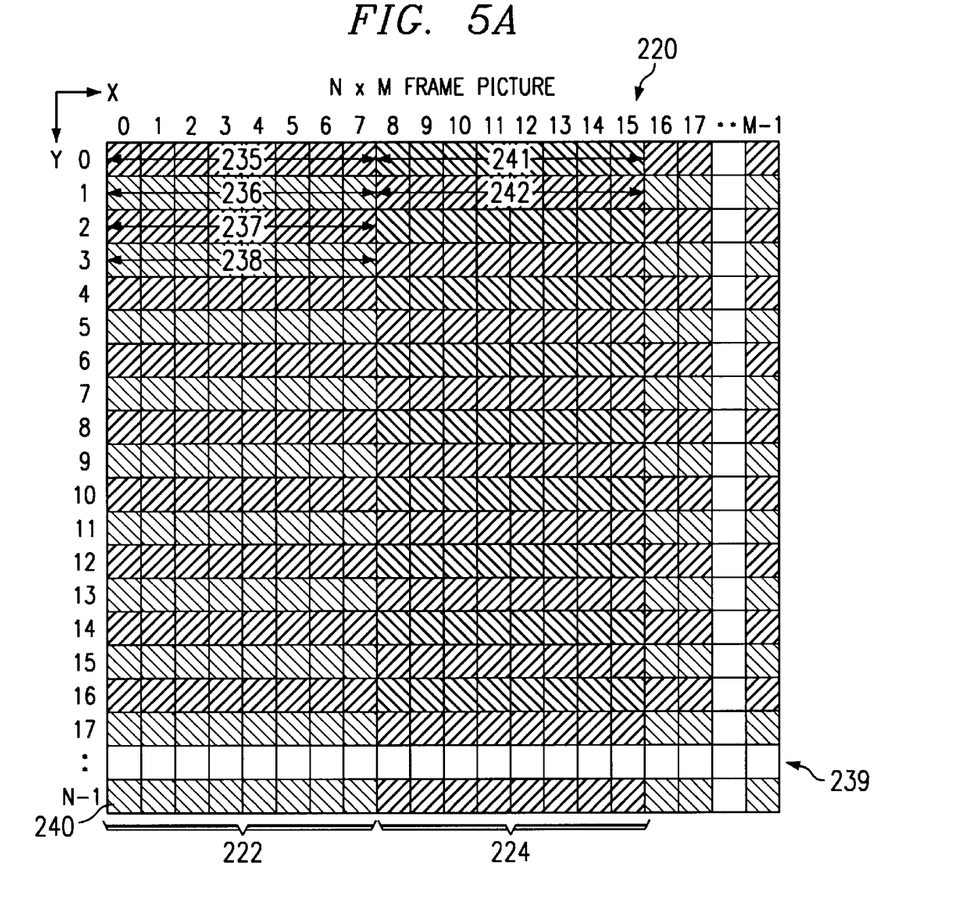
FIG. 5 is a block diagram of showing the storage format of a frame picture in a field organized memory.
Figure 5B:
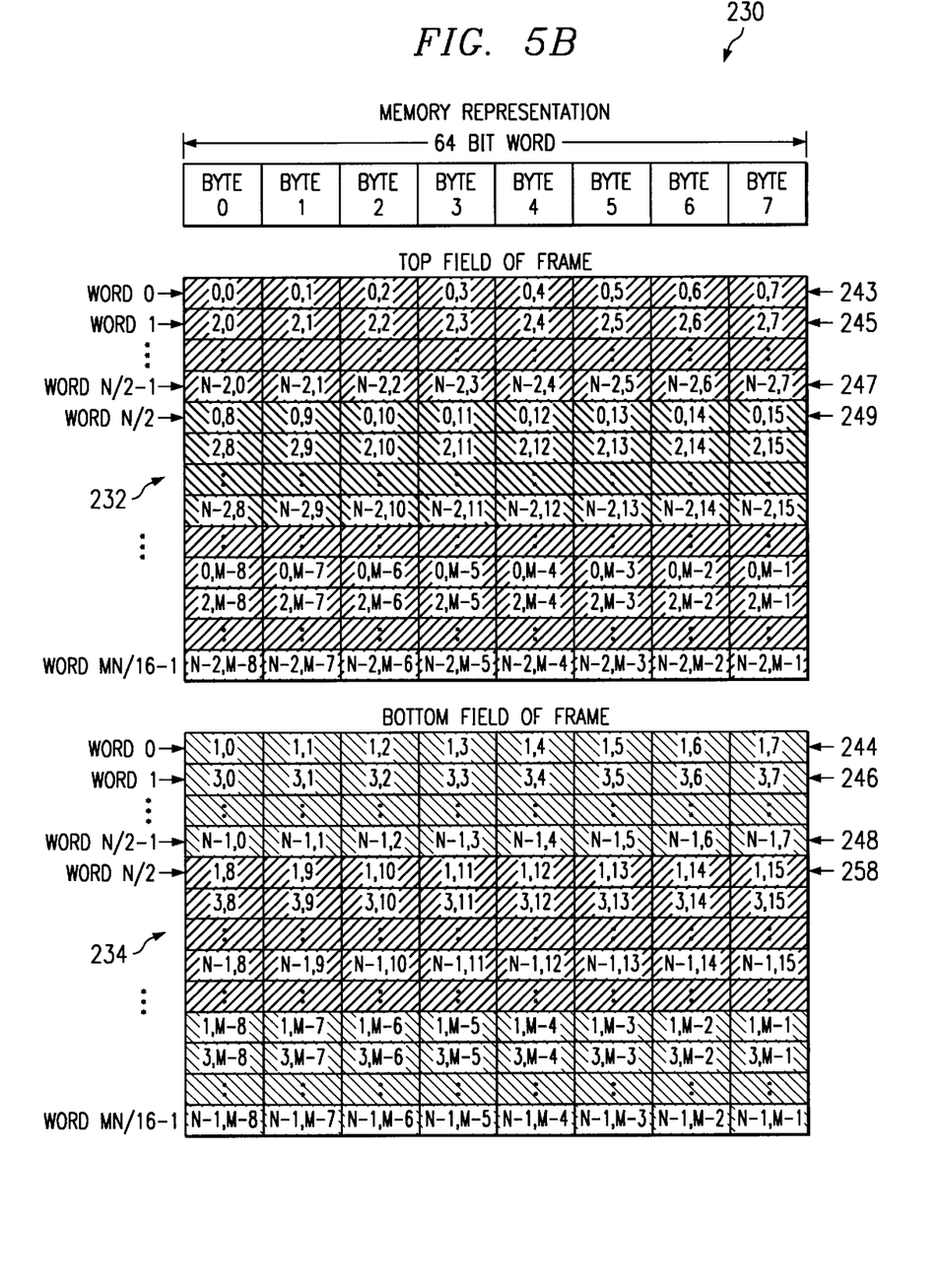

Mapping frame pictures into a memory buffer in a field organized memory will now be described. FIG. 5 shows a frame picture designated generally by reference number 220 and the corresponding memory buffer designated generally be the reference number 230. Again, the picture 220 is one of the components of the pictures used for prediction, e.g., the luminance component of a P picture. The memory buffer 230 is part of the memory of the device that contains the decoder. The memory is preferably shared with other components of the device the decoder is in, although it can be a dedicated memory.

Mapping the frame picture 220 into a memory buffer in a field organized memory 230 is the same for all of the pictures used for prediction, I, P, or B, for any color component of the picture (e.g., luminance or chrominance in YUV coordinates, or red, green or blue in RGB coordinates), and whether the picture is part of the video or image sequence, or a still image. Therefore, for ease of reference the method of mapping the picture into the memory buffer 230 will be described with reference to one representative picture 220.

The picture 220 has N rows and M columns. The memory has a first and a second memory buffers 232 and 234 each having rows and columns, each subdivided into words. Preferably, each word is 64 bits, however words of any length can be used.

As in the previous case, the picture is partitioned into stripes. Each of the stripes has 8 columns. This puts 8 pixels into each row in the stripe. 8 pixels will fit into one 64-bit word. Again stripes can have any predetermined number of columns as long as the number of bytes needed to fit the number of pixels in one row of a stripe is equal to the number of bytes in one memory word, allowing the storing of the data in one row of a stripe into one word. A location in the first memory buffer 232 is selected as the first word 243 of the first memory buffer 232. The data in the first odd row 235 of the first stripe 222 of the picture, is stored in the first word 243 of the first memory buffer 232. The data in the next odd row (i.e., the third row from top) 237 is stored in the next word 245 of the first memory buffer 232. This is continued for the entire stripe, mapping alternate rows in the stripe 222 to successive words in the first memory buffer 232. A location in the second memory buffer 234 is selected as the first word 244 of the second memory buffer 234. The data in the first even row 236 (i.e., the second row from top) of the first stripe 222 is stored in the first word 244 of the second memory buffer 234. The data in the next even row 238 (i.e., the fourth row from top) is stored in the next word 246 of the second memory buffer 234. This is again continued for the entire stripe. Storing an odd row of the stripe in a word directly after the word that stores the preceding odd row of the stripe allows easy retrieval of the odd rows in a single burst, and storing an even row of the stripe in a word directly after the word that stores the preceding even row of the stripe allows easy retrieval of the even rows in a single burst. This allows the retrieval of a rectangular array portion of one of the interlaced pictures (i.e., of one field) in a single burst, reducing the bandwidth required for the decoding process.

In one embodiment of the invention, the first odd row 241 of the subsequent stripe 224 is stored in the first memory buffer 232 in a word having a word address adjacent and subsequent to the word 247 storing the data of the last odd row 239 of the directly preceding stripe 222. The first even row 242 of the subsequent stripe 224 is stored in the second memory buffer 234 in a word 258 having a word address adjacent and subsequent to the word 248 storing the data of the last even row 240 of the directly preceding stripe 222. This allows easy retrieval of the rows of subsequent stripe 204 upon the retrieval of the last row or rows of the directly preceding stripe 222. The above process repeats identically for each stripe in the picture.

Again, when the typical prediction block to be accessed from the picture has more or equal number of pixels vertically than horizontally, it is advantageous for stripes to be vertical, i.e. the rows are horizontal and the columns are vertical as described thus far. When the prediction block has more pixels horizontally than vertically the reverse is true. It is more advantageous for the stripes to be horizontal, making the rows vertical and the columns horizontal.

Figure 6:
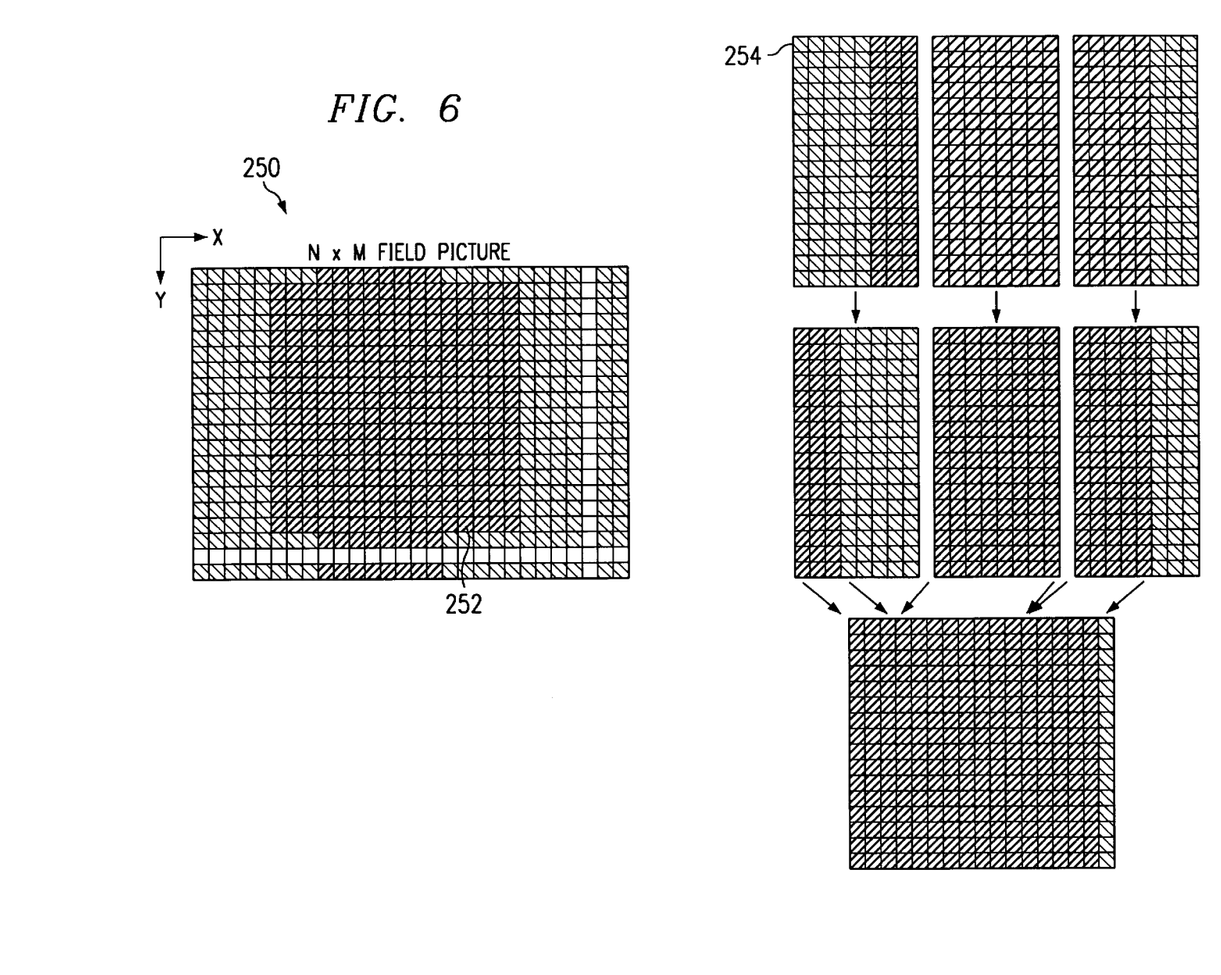
FIG. 6 is a block diagram showing the retrieving of an arbitrary 16×16 block from a memory buffer.

FIG. 6 shows how an arbitrary rectangular array portion 252 of the picture 250 is retrieved from the memory according to an embodiment of the invention. The array portion would be retrieved in the same manner whether the picture is an I, P, or B picture, for any color component of the picture (e.g., luminance or chrominance, red, green or blue), and whether the picture is part of a video or image sequence or a still image. The same method can be used to retrieve any derived array portion of the picture such as a macroblock or a block.

The number of rows and columns of the array portion of the picture and the row 254, hereinafter first row, and column 258, hereinafter first column, of the location in memory where the first datum of the array portion of the picture is determined. Let the rectangular array portion to be retrieved have the top left corner pixel located at first row R, and first column C, and the array portion's width be W columns and height be H rows. The starting (leftmost) stripe number to which the array portion belongs is computed as:

S0=C div8, and the ending (rightmost) stripe number is

S1=(C+W−1)div8.

Let WO be the word address in memory where the first row of the first stripe is stored. For each stripe S ranging from S0 to S1, the number of rows that is in the desired rectangular array portion is read in one burst of H memory words, starting from the word address given by

AO(S)=WO+N×S+R.

A part of each stripe containing the array portion is read in one burst starting at the first row 254 of the array portion until the number of rows in the array portion is read. Determining the number of stripes having data in the array portion of the digital array can be performed prior to starting to read the stripes, or can be performed as the stripes are read. For example, by reading the stripe and determining that the stripe contains the last of the columns of the desired array portion.

The first stripe S0 that is read in may have more columns on the left than the desired array portion, while the last stripe S1 may have more columns on the right. Hence for each stripe, the columns within the stripe corresponding to the columns in the desired stripe are selected, and then stored in the local memory buffer. The aim is to ensure that all columns in the desired rectangular array portion are stored adjacent to each other in the local buffer. There are several ways to accomplish this. One way, shown in FIG. 6, is by rotating each word in a stripe such that the columns corresponding to the columns in the array portion of the digital array are in the least significant bytes of each word. The correct number of the least significant bytes of each word of each of the stripes read is then stored in the local memory buffer. Another way to accomplish selecting the columns corresponding to the desired array portion of the picture is to rotate each word in a stripe such that the columns corresponding to the columns in the array portion of the digital array are in the most significant bytes of each word. The correct number of the most significant bytes of each of word of each of the stripes read is then stored in the local memory buffer.

As described above, the memory can be in a used in an electronic system dedicated to playback of video and audio, such as a television or a digital versatile disc (DVD) player, or on an electronic system where image display and audio playback is just one feature of the system, such as a computer. It is more advantageous to use the memory in an electronic system where playback is only one of the features, so the memory can be shared.

The present invention requires 2 bursts in the best case scenario and 3 bursts in a worst case scenario to retrieve the luminance component of a typical prediction block and 2 bursts to write the luminance component of the macroblock being decoded, when the words are 64 bits wide and the stripes have 8 columns, for frame pictures in a frame organized memory or field pictures in a field organized memory. Frame pictures in a field organized memory require twice as many bursts. The corresponding numbers for the chrominance component are 1 burst, 2 bursts, and 1 burst, respectively. Other memory mapping schemes typically require many more bursts with the associated additional latency periods.

Figure 7:
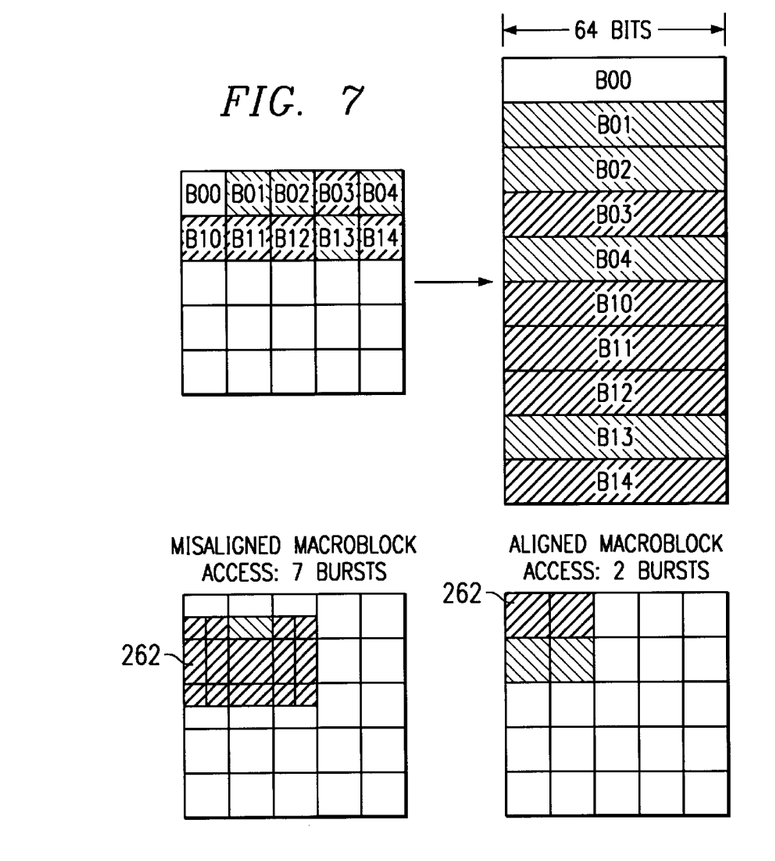
FIG. 7 is a block diagram of macroblock based picture mapping.

For example, FIG. 7 shows a block based mapping scheme. 2 bursts are required to read the luminance component of an aligned 260 macroblock and 2 bursts to write it. For a misaligned prediction block 262, 7 bursts are required to retrieve the luminance component, and 2 bursts to write the luminance component of the macroblock being decoded. Therefore, the block based memory mapping scheme can require at least 4 more latency periods for the luminance component of a macroblock decoded using forward prediction only, than the worst case of the proposed memory mapping scheme, increasing the bandwidth required for the decompression of the picture. The number of additional latency periods increases to 8, for the luminance component of a macroblock decoded using forward and backward predictions.

Figure 8:
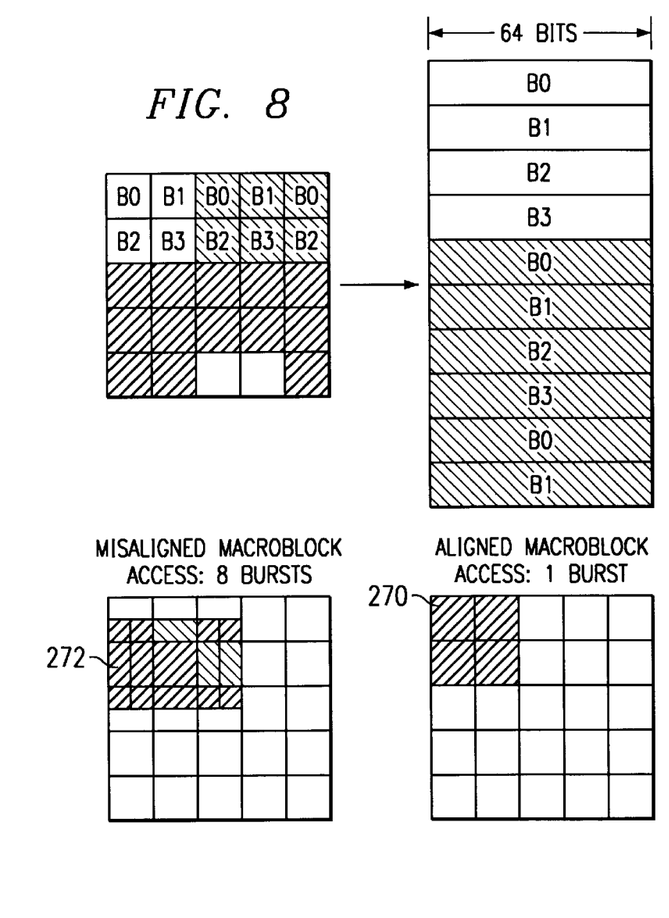
FIG. 8 is a block diagram of block based picture mapping.

FIG. 8 shows a macroblock based mapping scheme. 1 burst is required to read the luminance component of an aligned 270 macroblock and 1 burst to write it. For a misaligned prediction block 272, 8 bursts are required to retrieve the luminance component and 1 burst to write the luminance component of the macroblock being decoded. Therefore, the macroblock based memory mapping scheme can require at least 4 more for latency periods, for decoding the luminance component of a macroblock decode using forward prediction only, than the worst case of the proposed memory mapping scheme, again increasing the bandwidth required for the decompression of the picture. Similarly, the number of additional latency periods increases to 8 for the luminance component of a macroblock decoded using forward and backward prediction.

A memory mapping scheme where the picture is partitioned into stripes and the rows of the stripes are stored in sequential words to enable an array portion of a stripe to be read in one burst allows a reduction in the number of burst and in the associated overhead per burst required to retrieve the prediction block needed to decompress a macroblock. This reduces the bandwidth required to decompress a bitstream.

Further background on compression can be found in: International Organization for Standards, INFORMATION TECHNOLOGY—CODING OF MOVING PICTURES AND ASSOCIATED AUDIO FOR DIGITAL STORAGE MEDIA AT UP TO ABOUT 1.5 MBITS/S, ISO/IEC 11172, Parts 1–6, International Organization for Standards; International Standards Organization, INFORTION TECHNOLOGY—GENERIC CODING OF MOVING PIcTUREs AND ASSOCIATED AUDIO INFORMATION, ISO/IEC 13818, Parts 1–4, International Organization for Standards; Datasheet "STi3500A" Datasheet of SGS-THOMSON Microelectronics; STi3500A—Advanced Information for an MPEG Audio/MPEG-2 Video Integrated Decoder" (June 1995). All of the above references incorporated herein by reference.

Although the invention has been specifically described with reference to several preferred and alternative embodiments, it will be understood by those skilled in the art having reference to the current specification and drawings, that various modifications may be made and further alternatives are possible without departing from the spirit and scope of the invention as set forth in the appended claims.

We claim:

1. A method of mapping of a digital array of data having rows and columns into a memory subdivided into words having a predetermined number of bytes, the digital array of data representing an aspect of a picture, the picture being an entire picture, the aspect of a picture representing at least one component of the entire picture comprising the steps of:

partitioning the digital array into two or more stripes, each stripe having a predetermined number of the columns of the digital array of data, each row of each of the stripes having a number of bytes;

storing the data in the first row of one of the stripes in a first word in the memory;

storing the data in each subsequent row of the stripe in a word in the memory having a word address adjacent and subsequent to the word storing the data of the directly preceding row, whereby easy retrieval of the subsequent row is accomplished upon the retrieval of the preceding row.

2. The method of claim 1, wherein the number of bytes in one row of one stripe being equal to the number of bytes in one word for storing the data in one row of a stripe in one word.

3. The method of claim 1, wherein the memory comprises a burst memory.

4. The method of claim 1, wherein the memory comprises a DRAM.

5. The method of claim 1, wherein the rows are horizontal and the columns are vertical.

6. The method of claim 1, wherein the picture represents a displayable image in a video sequence.

7. The method of claim 6, wherein the video sequence comprises an MPEG-2 video sequence.

8. The method of claim 1, wherein the predetermined number of columns is 8.

9. The method of claim 1, wherein the aspect of a picture comprises the luminance components of the picture.

10. The method of claim 1, wherein the aspect of a picture comprises the chrominance components of the picture.

11. A method of mapping of a digital array of data having even and odd rows and columns into a memory having first and second memory buffers, the digital array of data representing an aspect of a picture, the picture being an entire picture, the aspect of a picture representing at least one component of the entire picture a red, a green, or a blue component in RGB coordinates, or such as at least some other component of the entire picture, each memory buffer subdivided into words having a predetermined number of bytes, comprising the steps of:

partitioning the digital array in two or more stripes, each stripe having a predetermined number of the columns of the digital array of data, each row of each of the stripes having a number of bytes;

storing the data in the first odd row of one of the stripes in a first word of the first memory buffer;

storing the data in each subsequent odd row of the stripe in a word in the first memory buffer having a word address adjacent and subsequent to the word storing the data of the directly preceding odd row, whereby easy retrieval of the subsequent odd row is accomplished upon the retrieval of the preceding odd row;

storing the data in the first even row of the stripe in a first word of the second memory buffer;

storing the data in each subsequent even row of the stripe in a word in the second memory buffer having a word address adjacent and subsequent to the word storing the data of the directly preceding even row, whereby easy retrieval of the subsequent even row is accomplished upon the retrieval of the preceding even row.

12. The method of claim 11, wherein the number of bytes in one row of one stripe being equal to the number of bytes in one word for storing the data in one row of a stripe in one word.

13. The method of claim 11, wherein the memory comprises a burst memory.

14. The method of claim 11, wherein the memory comprises a DRAM.

15. The method of claim 11, wherein the rows are horizontal and the columns are vertical.

16. The method of claim 11, wherein the picture represents a displayable image in a video sequence.

17. The method of claim 16, wherein the video sequence comprises an MPEG-2 video sequence.

18. The method of claim 11, wherein the predetermined number of columns is 8.

19. The method of claim 11, wherein the aspect of a picture comprises the luminance components of the picture.

20. The method of claim 11, wherein the aspect of a picture comprises the chrominance components of the picture.

21. A method of reading an array portion of a digital array of data from a burst memory subdivided into words having a predetermined number of bytes, the digital array of data representing an aspect of a picture, the picture being an entire picture, the aspect of a picture representing at least one component of the entire picture such as a luminance component or a chrominance component of the picture in YUV coordinates, or such as a red, a green, or a blue component in RGB coordinates, or such as at least some other component of the entire picture, the array portion of the digital array having a first byte of data and a predetermined number of rows and columns, the digital array partitioned into two or more stripes, each stripe having a predetermined number of the columns of the digital array of data including a first and last column, each row of each of the stripes having a number of bytes, the stripes of the digital array of data being stored in memory according to a stripe order, the method comprising the steps of:

determining an address of a first row and a first column in memory where the first byte of data of the array portion is stored;

determining the number of stripes having data in the array portion of the digital array;

reading a part of each stripe in one burst starting at the first row, the part of the first stripe having at least the same number of rows as the array portion for reading the entire part of each stripe corresponding to the array portion of the digital array in one burst;

selecting the columns in each stripe corresponding to the columns in the array portion of the digital array.

22. The method of claim 21, wherein the step of determining the number of stripes having data in the array portion of the digital array occurs concurrently with the step of reading an array portion of each stripe in one burst.

23. The method of claim 21, wherein the number of bytes in one row of one stripe being equal to the number of bytes in one word for storing the data in one row of a stripe in one word.

24. The method of claim 21, further comprising the step of storing the selected columns in each stripe in a memory buffer.

25. The method of claim 21, wherein the step of selecting the columns in each stripe corresponding to the columns in the array portion of the digital array comprises:

rotating each word corresponding to a stripe having the first column such that the columns corresponding to the columns in the array portion of the digital array are in the least significant bytes of each word.

26. The method of claim 21, wherein the step of selecting the columns in each stripe corresponding to the columns in the array portion of the digital array comprises:

rotating each word corresponding to a stripe having the last column such that the columns corresponding to the columns in the array portion of the digital array are in the most significant bytes of each word.

27. The method of claim 21, wherein the array portion of the digital array comprises a macroblock.

28. The method of claim 21, wherein the array portion of the digital array comprises a block.

29. The method of claim 21, wherein the memory comprises a DRAM.

30. The method of claim 21, wherein the rows are horizontal and the columns are vertical.

31. The method of claim 21, wherein the picture represents a displayable image in a video sequence.

32. The method of claim 31, wherein the video sequence comprises an MPEG-2 video sequence.

33. The method of claim 21, wherein the aspect of a picture comprises the luminance components of the picture.

34. The method of claim 21, wherein the aspect of a picture comprises the chrominance components of the picture.

35. A memory for storing a digital array of data having rows and columns partitioned into two or more stripes, each stripe having a predetermined number of columns of the digital array of data, the digital array of data representing an aspect of a picture, the picture being an entire picture, the aspect of a picture representing at least one component of the entire picture comprising:

a plurality of words, including a first word, each having a predetermined number of bytes;

the data in the first row of one of the stripes is in a first word;

the data in each subsequent row of the stripe is in a word having a word address adjacent and subsequent to the word storing the data of the directly preceding row, whereby easy retrieval of the subsequent row is accomplished upon the retrieval of the preceding row;

a plurality of memory rows, each row having one or more of the plurality of words; and a plurality of memory columns.

36. The memory of claim 35, wherein the number of bytes in one row of one stripe being equal to the number of bytes in one word for storing the data in one row of a stripe in one word.

37. The memory of claim 35, wherein the memory comprises a burst memory.

38. The memory of claim 35, wherein the memory comprises a DRAM.

39. The memory of claim 35, wherein the rows are horizontal and the columns are vertical.

40. The memory of claim 35, wherein the picture represents a displayable image in a video sequence.

41. The memory of claim 40, wherein the video sequence comprises an MPEG-2 video sequence.

42. The memory of claim 35, wherein the predetermined number of columns is 8.

43. The memory of claim 35, wherein the aspect of a picture comprises the luminance components of the picture.

44. The memory of claim 35, wherein the aspect of a picture comprises the chrominance components of the picture.

45. A computer comprising:

an input device;

an output device;

a memory for storing a digital array of data having rows and columns, the digital array of data representing an aspect of a picture, the picture being an entire picture, the aspect of a picture representing at least one component of the entire picture, the digital array of data partitioned into two or more stripes, each stripe having a predetermined number of the columns of the digital array of data, the memory including:

a plurality of words, including a first word, each having a predetermined number of bytes;

the data in the first row of one of the stripe is in a first word;

the data in each subsequent row of the stripe is in a word having a word address adjacent and subsequent to the word storing the data of the directly preceding row, whereby easy retrieval of the subsequent row is accomplished upon the retrieval of the preceding row;

a plurality of memory rows, each row having one or more of the plurality of words; and a plurality of memory columns.

46. The computer of claim 45, wherein the number of bytes in one row of one stripe being equal to the number of bytes in one word for storing the data in one row of a stripe in one word.

47. The computer of claim 45, wherein the memory comprises a burst memory.

48. The computer of claim 45, wherein the memory comprises a DRAM.

49. The computer of claim 45, wherein the rows are horizontal and the columns are vertical.

50. The computer of claim 45, wherein the picture represents a displayable image in a video sequence.

51. The computer of claim 50, wherein the video sequence comprises an MPEG-2 video sequence.

52. The computer of claim 45, wherein the predetermined number of columns is 8.

53. The method of claim 45, wherein the aspect of a picture comprises the luminance components of the picture.

54. The method of claim 45, wherein the aspect of a picture comprises the chrominance components of the picture.

* * * * *